(12) United States Patent
Hill et al.

(10) Patent No.: US 6,925,556 B2
(45) Date of Patent: Aug. 2, 2005

(54) METHOD AND SYSTEM TO DETERMINE THE BOOTSTRAP PROCESSOR FROM A PLURALITY OF OPERABLE PROCESSORS

(75) Inventors: David Lawrence Hill, Cornelius, OR (US); Frank Binns, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 09/783,798

(22) Filed: Feb. 14, 2001

(65) Prior Publication Data

US 2002/0112151 A1 Aug. 15, 2002

(51) Int. Cl.$^7$ .................. G06F 15/177; G06F 12/00
(52) U.S. Cl. ................... 713/2; 713/1; 710/240
(58) Field of Search ............... 714/36, 11, 10; 713/1, 2; 710/113, 240

(56) References Cited

U.S. PATENT DOCUMENTS

| | | | | |
|---|---|---|---|---|
| 3,614,745 A | * | 10/1971 | Podvin et al. | 718/104 |
| 4,663,708 A | * | 5/1987 | Taub | 710/111 |
| 5,051,888 A | * | 9/1991 | Hansen et al. | 703/23 |
| 5,222,237 A | * | 6/1993 | Hillis | 712/204 |
| 5,450,576 A | | 9/1995 | Kennedy | |
| 5,659,748 A | * | 8/1997 | Kennedy | 713/2 |
| 5,724,527 A | | 3/1998 | Karnik et al. | |
| 5,768,585 A | * | 6/1998 | Tetrick et al. | 713/2 |
| 5,790,850 A | * | 8/1998 | Natu | 713/2 |
| 5,802,578 A | * | 9/1998 | Lovett | 711/147 |
| 5,875,309 A | * | 2/1999 | Itkowsky et al. | 710/113 |
| 5,904,733 A | | 5/1999 | Jayakumar | |
| 5,938,765 A | * | 8/1999 | Dove et al. | 713/1 |
| 6,108,781 A | | 8/2000 | Jayakumar | |
| 6,138,234 A | * | 10/2000 | Lee et al. | 713/2 |
| 6,158,000 A | * | 12/2000 | Collins | 713/1 |
| 6,467,006 B1 | * | 10/2002 | Alexander et al. | 710/240 |
| 6,473,857 B1 | * | 10/2002 | Panas et al. | 713/2 |
| 6,550,019 B1 | * | 4/2003 | Ahrens et al. | 714/10 |
| 6,584,560 B1 | * | 6/2003 | Kroun et al. | 713/2 |
| 6,594,756 B1 | * | 7/2003 | Datta et al. | 713/2 |
| 6,611,911 B1 | * | 8/2003 | O'Shea et al. | 713/1 |
| 6,721,429 B1 | * | 4/2004 | Akamatsu et al. | 381/122 |
| 6,760,838 B2 | * | 7/2004 | Owen et al. | 713/1 |
| 6,766,474 B2 | * | 7/2004 | Schelling | 714/36 |

FOREIGN PATENT DOCUMENTS

JP          402118868 A   *   5/1990

OTHER PUBLICATIONS

MindShare Inc, and Tom Shanley, Pentium Pro and Pentium II System Architecture–second edition, pp. 57–60.

* cited by examiner

Primary Examiner—Chun Cao
(74) Attorney, Agent, or Firm—Shireen I. Bacon

(57) ABSTRACT

Methods, apparatuses, and systems are provided to determine a bootstrap processor. In an embodiment, the method determines a bootstrap processor from a plurality of operable processors in a fault tolerant multiprocessor system irrespective of an initialization time of a particular operable processor.

16 Claims, 4 Drawing Sheets

METHOD AND SYSTEM TO DETERMINE THE BOOTSTRAP PROCESSOR FROM A PLURALITY OF OPERABLE PROCESSORS

FIELD OF THE INVENTION

This invention generally relates to the field of multiprocessor systems. More particularly this invention relates to systems and methods for selecting a bootstrap processor in multiprocessor systems.

BACKGROUND OF THE INVENTION

An element of asymmetry in symmetric multiprocessor (SMP) systems is introduced by the need to select a single processor to bootstrap the system. At system start-up and whenever the system is reset, each processor in an SMP system typically is responsible for determining that its internal components and interfaces are functioning properly. The bootstrap processor (BSP) is unique in that it handles initialization procedures for the system as a whole. These procedures include checking the integrity of memory, identifying properties of the system logic, loading the operating system into memory, and starting the remaining processors. These functions temporarily introduce asymmetry into SMP systems by assigning a unique role to the BSP.

Conventional systems employ a variety of techniques for selecting a BSP from among the processors of an SMP system. In one SMP system, the processors are coupled through a dedicated interprocessor interrupt bus. On reset, each processor asserts an inverted form of an assigned processor identification number (processor ID) onto a shared line of the interrupt bus. As soon as a processor asserting a one on the line detects that another processor is asserting a zero, the first processor relinquishes the line. The processor that survives this arbitration procedure is the processor having the highest valued processor ID. This processor gains control of the bus and sends a message to all processors on the interrupt bus, identifying itself as the BSP. This approach is exemplified by SMP systems based on the Pentium Pro (registered Trademark) microprocessor of Intel Corporation.

A number of disadvantages exist in this approach to BSP selection. This BSP selection process requires a dedicated interprocessor bus. This bus is relatively slow by the standards of today's processor speeds, making the boot process unnecessarily slow. In addition, each bus can only support clusters of up to four processors. Additional processors must be accommodated in separate clusters. The need for a dedicated interprocessor bus increases the difficultly in extending this method across multiple clusters.

Another method for selecting the BSP simply designates the processor in a specified slot as the BSP. This strategy introduces a permanent asymmetry into the SMP system, and if the processor in the designated slot fails, no mechanism is provided for designating a different processor as the BSP. Thus, this BSP selection system suffers from the disadvantage of not having a fault tolerant mechanism. The fault tolerant mechanism allows the substitution of a separate processor to be the BSP if the predetermined BSP turns out to be faulty.

Other methods for selecting BSPs in SMP systems identify the first processor to write to a shared variable as the BSP. In these systems, a race occurs between all of the eligible processors. The processor with the fastest initialization time is typically elected to be the BSP. Once a BSP has been initially determined for a particular set of processors that particular processor remains the BSP unless something happens to change the initialization time of a processor in that set of processors. Vendors tend to base decisions and assumptions using this particular processor as being the BSP. However, both later versions of a processor, such as version 2 or version 3, and later versions of micro code associated with a processor can significantly affect the initialization time of a particular processor. Thus, if any processor in the system under goes such a change, due to maintenance, replacing a defective component, upgrading to a newer version to take advantage of a new capability, etc, then the race may create a new BSP. However, after the time that the vendors have based their assumptions on a particular processor being the BSP, then having an unpredictable BSP process is not beneficial. A further disadvantage is that more system components must be initialized before the BSP may be determined. These systems must initialize components outside the processors themselves, such as a shared variable in the chipset, to determine the BSP.

BRIEF DESCRIPTION OF THE DRAWINGS

The drawings refer to the invention in which.

Figure 1:
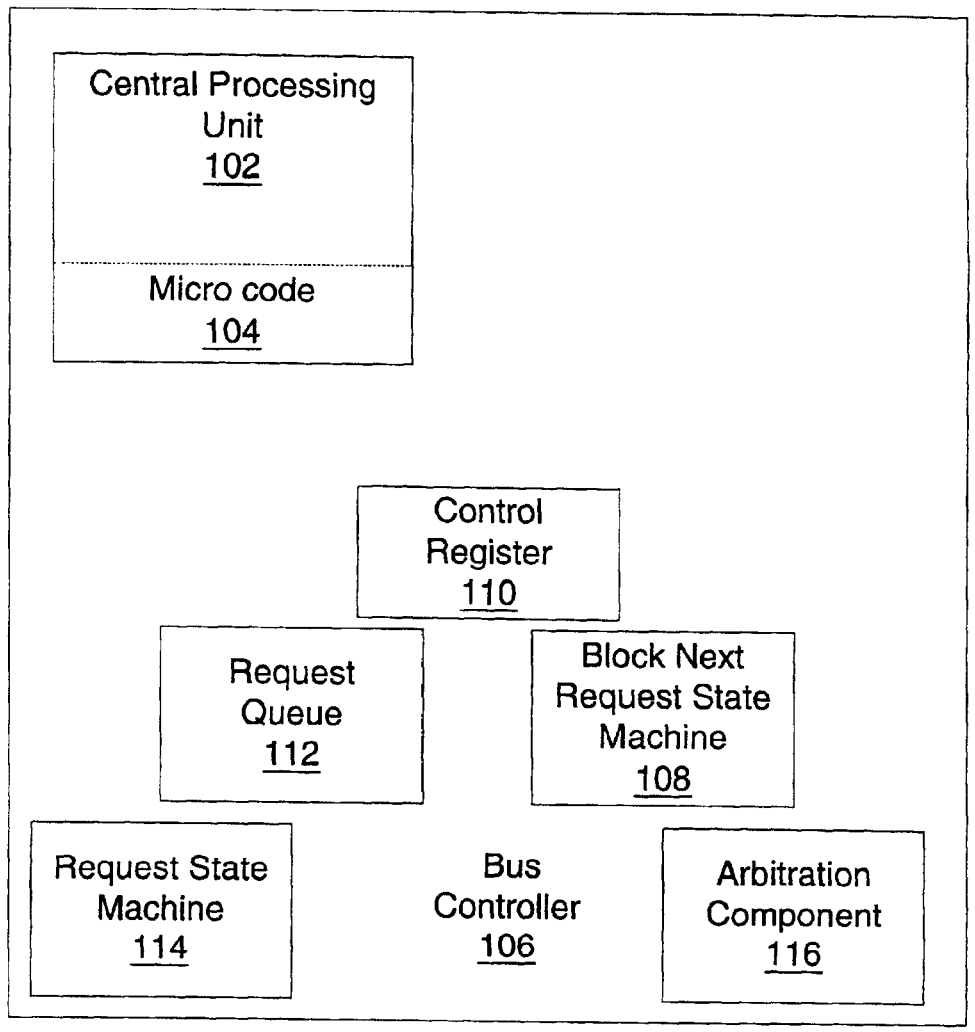
FIG. 1 illustrates an embodiment of a processor having a central processing unit and a bus controller.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. The term coupled is defined as meaning connected either directly or indirectly.

In general, methods, apparatuses, and systems are disclosed. The methods, apparatuses, and systems determine a bootstrap processor. In an embodiment, the system determines a bootstrap processor from a plurality of operable processors in a fault tolerant multiprocessor system irrespective of an initialization time of a particular operable processor.

FIG. 1 illustrates an embodiment of a processor having a central processing unit and a bus controller. In an embodiment, the central processing unit 102 may contain one or more processors packaged in a single die and micro code 104 instructions. The bus controller 106 is a component of the processor which is used to send and receive signals from the system bus (not shown), such as the front side bus.

The bus controller 106 also monitors and keeps track of all the transactions occurring on the system bus (not shown). In an embodiment, the bus controller 106 may contain block next request state machine 108, a control register 110, a request queue 112, a request state machine 114, and an arbitration component 116. The central processing unit 102 internally initializes the processor components, e.g., sets bits in the control register 110, directs operations of other components within the processor, as well as many other functions. The block next request state machine 108 generates a stall signal on the system bus (not shown) that communicates to all of the other processors that this processor is not ready to accept system bus transactions.

The control register 110 stores bits of information, such as the state of various components in the processor and system. The arbitration component 116 checks the system bus (not shown) for signals, such as the removal of the stall signal, that indicate that all of the operable processors are ready to enter the bootstrap arbitration process. The request queue 112 stores transactions, such as various commands, and the priority of those transactions. The request queue 112 couples this information to the request state machine 114. The request state machine 114 generates a bus request signal to use the system bus (not shown) for conducting transactions. In an embodiment, the request state machine 114 receives inputs that denote the request queue 112 has a transaction stored and the arbitration component 116 indicates that all of the operable processors are ready to enter the bootstrap arbitration process. The request state machine 114 stalls conducting activity on the system bus (not shown) until these two signals or two conditions, are satisfied.

Figure 2:
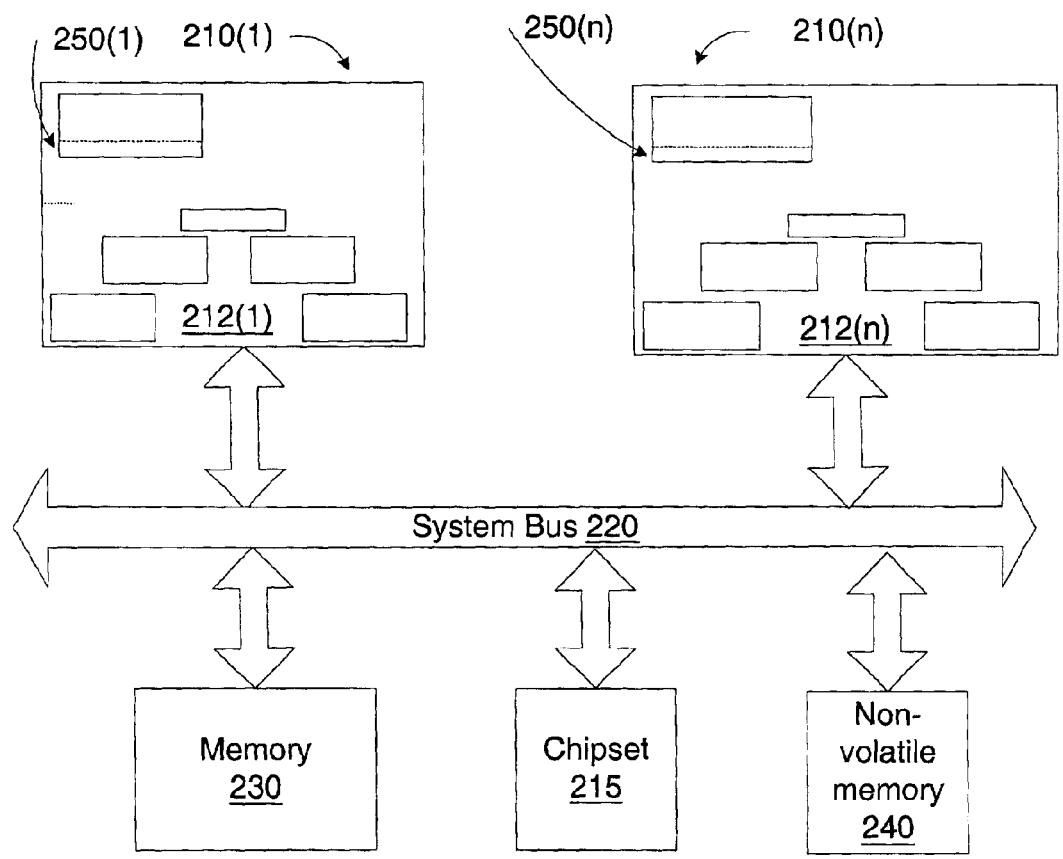
FIG. 2 illustrates an embodiment of a multiprocessor system (MPS) to implement a BSP selection process.

FIG. 2 illustrates an embodiment of a multiprocessor system (MPS) to implement a BSP selection process. In an embodiment, MPS 200 comprises processors 210(1)–210(*n*), a chipset 215, a memory 230, and either or both a non-volatile memory 240 or micro code 250(1)–250(*n*) contained within processors 210(1)–210(*n*), all of which communicate through a system bus 220. Each processor 210(1)–210(*n*) includes a bus controller 212(1)–212(*n*), respectively. In the following discussion, indices are dropped from references to processors 210(1)–210(*n*), bus controllers 212(1)–212(*n*), and other indexed elements unless the discussion applies to a specific processor 210, bus controller 212, or other indexed element, respectively.

In an embodiment, non-volatile memory 240 stores various procedures used by processors 210 when MPS 200 is first turned on or when MPS 200 is reset by a software or hardware event. Non-volatile memory 240 is used in these cases because data stored in the non-volatile memory 240 persists even when power to MPS 200 is cut off. In addition, until memory 230 has been tested and determined to be reliable, it is not possible to rely on the data stored there. In one embodiment of the present invention, the BSP selection method implemented by processors 210 is stored in non-volatile memory 240 and accessed through system bus 220.

In an embodiment, BSP routines are stored in the form of micro code 250 on the processors 210. Micro code 250 may be a permanent memory that holds the elementary circuit operations a computer must perform for some or all instructions in its instruction set. Micro code 250 acts as a translation layer between the instruction and the electronic level of the computer.

The bus controller 212 component of the processor 210 communicates with other components in the system via the system bus 220. In an embodiment, processors 210 form the core of MPS 200 and the boot process typically begins with each of the processors 210 running a built in self test (BIST) when an asserted reset signal is detected. BIST is used to determine the status of the processor's functional units and interfaces, including, for example, the processor's bus controller 212. Thereafter, one of processors 210 is selected as the bootstrap processor (BSP) 210. The BSP coordinates testing of the rest of MPS 200 and loads the operating system from memory 230 or some other storage device such as a hard drive or floppy drive (not shown) accessed through an input-output bus. These and other boot procedures are typically initiated at the end of power on self test (POST).

The reliability of memory 230 and the data paths between memory 230 and processors 210 are not tested until the BSP has been selected and the POST run. Accordingly, the power on self test programs run by processors 210 and boot procedures run by the BSP are stored in static memory devices such as non-volatile memory 240. Since static memory devices maintain the integrity of their data even when power to MPS 200 is turned off, the data does not have to be reloaded into each time MPS 200 is powered on. Non-volatile memory 240 is typically a read only memory (ROM) device such as an electrically erasable and programmable ROM (EEPROM) or flash memory. In an embodiment, BIST and POST procedures or parts of these procedures may be stored as micro code 250 on the processor 210. In an embodiment, the processors only need to pass their internal POST and BIST testing to be eligible to participate in the BSP selection process, without having to initialize memory 230 or the chipset 215.

In addition to being powered on from the off-state (cold boot), MPS 200 may be reset when it is already powered on (warm boot). In a warm boot, processors 210 may not be required to run a portion of their BISTs, and other parts of the cold boot procedure may also be by-passed. However, a BSP must still be selected from among processors 210 and various POST procedures must still be run. The event that triggers reset may be caused by failure of the BSP itself, in which case selection of a new BSP is imperative.

Figure 3:
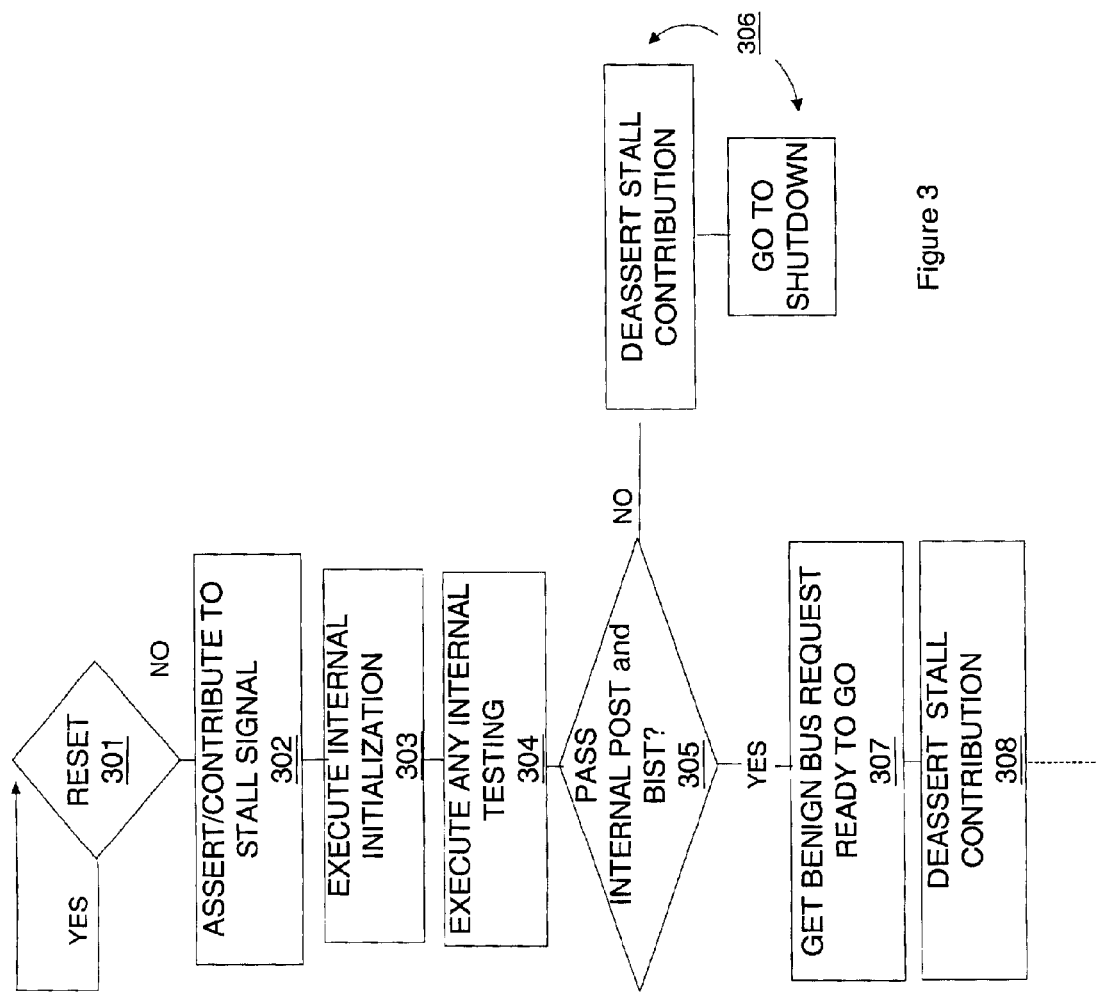
FIG. 3 and FIG. 4 illustrate an embodiment of steps taken to determine a BSP in a multiprocessor system.
Figure 4:
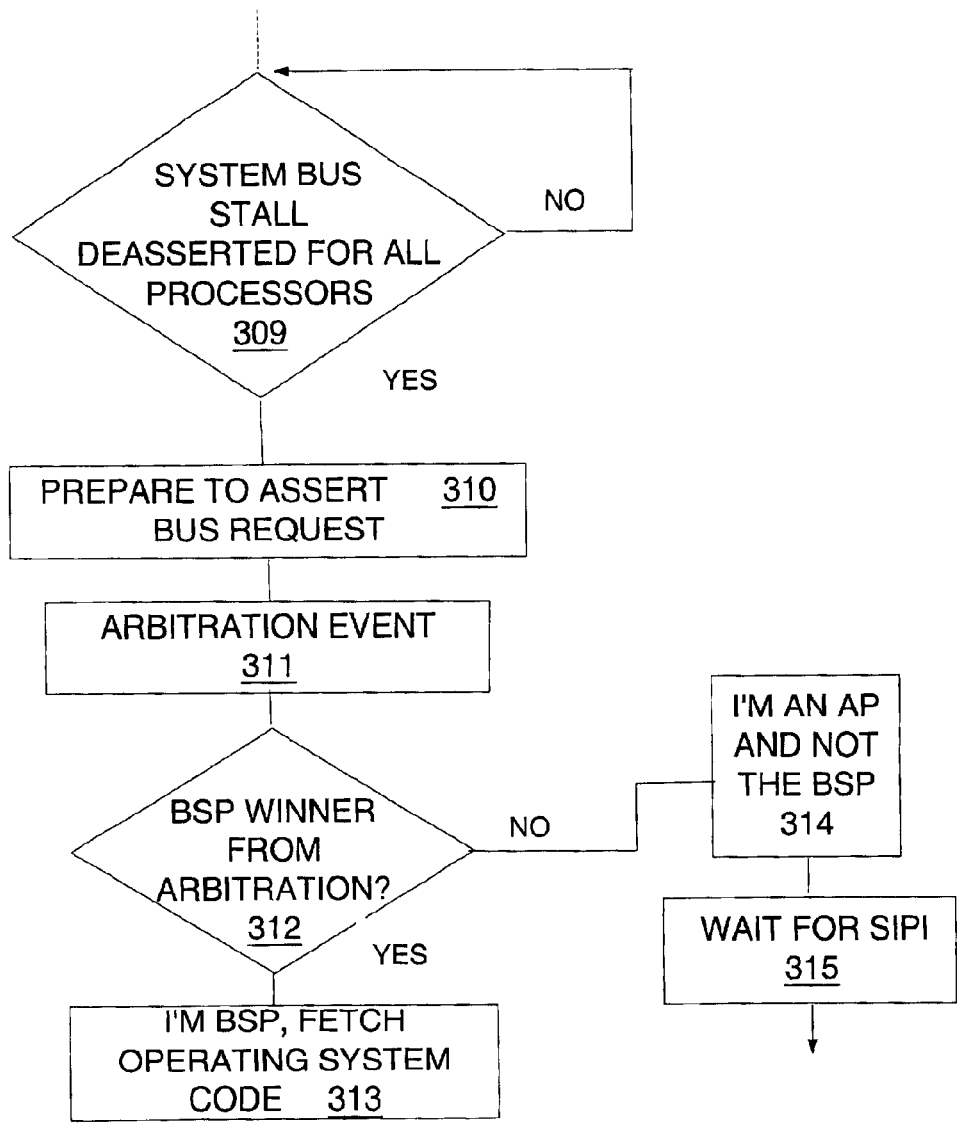

FIG. 3 and FIG. 4 illustrate an embodiment of steps taken to determine a BSP in a multiprocessor system.

In step 301, the processor detects a reset signal. The reset signal forces the processor to begin execution at a known state. When reset is asserted, the central processing unit (CPU) immediately aborts all bus activity and performs the reset sequence. In an embodiment, the reset signal detected may come from a warm reset signal, a cold reset signal, a local reset signal, or a system wide reset signal.

In step 302, upon sensing the reset signal each processor asserts a signal to stall transactional activity on the system bus, such as a block next request signal. In an embodiment, the block next request state machine in each processor asserts the stall signal by driving the system bus to a logical 0. In an embodiment, the block next request state machine in each processor asserts the stall signal by driving the system bus to a logical 1. In an embodiment, the block next request state machine in each processor asserts the stall signal by toggling the system bus from a logical 0 to a logical 1. In an embodiment, block next request state machine in each processor asserts the stall signal by driving the system bus to a logic state on a first clock cycle and releasing the system bus on a second clock cycle.

In an embodiment, the block next request state machine contains circuitry which makes the block next request state machine to automatically assert the stall signal on the system bus when coming out of reset. In an embodiment, the CPU following instructions in the micro code sets a bit, such as the multiprocessor initialization control register (MP_INIT CR) bit, in the control registers to indicate that the BSP has not yet been determined. In an embodiment, the block next request state machine receives a signal from the control register indicating that the BSP has not yet been determined. Next, the CPU sets a bit in the control register, such as a block next request bit, to direct the block next request state machine to contribute to the stall signal. The block next request state machine contributes to the common stall signal on the system bus which communicates to all the processors to stall transmitting transactional activities across the system bus. In an embodiment, the signal on the system bus stalling transactional activities is the block next request signal. In an embodiment, each processor connected to the system bus asserts, and thus contributes to, the stall signal across the system bus. In an embodiment, the "MP_INIT done" is cleared at reset.

In step 303, the processor executes internal initialization of itself and the remainder of the processing components as previously described.

In step 304, the processor also executes any internal testing. In an embodiment, processor executes any built in self test and/or reset instruction stored in the micro code. The processor sets the initial architectural state. The processor sets known variables, such as bits in the control register, to a known state.

In step 305, the CPU executing micro code determines whether this processor and all its internal components successfully completed their initialization sequences, such as BIST and POST.

In step 306, if a component of the processor has not successfully completed its initialization sequence (internal POST and BIST), then the micro code instructs the CPU to clear the bit in the control register causing the block next request state machine to contribute to the stall signal, set in step 302. Further, the block next request state machine deasserts this processor's contribution to the stall signal on the system bus and proceeds to enter a shutdown mode.

In step 307, if all the internal components of the processor successfully satisfy their initiation sequences, then micro code sends a benign transaction, such as a no-op, to the request queue. The request queue stores the transaction. The request queue notifies the request state machine that a transaction is stored and ready to be executed.

In step 308, if all of the internal components of the processor have successfully completed their initialization sequence, then micro code instructs the CPU to clear the bit in the control register that caused the block next request state machine to contribute to the stall signal, set in step 302. Further, the block next request state machine deasserts this processor's contribution to the stall signal on the system bus. In an embodiment, the micro code also starts polling on the MP_Init done bit in the control register. In an embodiment, all of the processors which complete their initialization successfully are considered to be operable processors.

In step 309, the arbitration component monitors the system bus to detect if the stall signal is deasserted by all of the processors. The request state machine in each processor ignores any signal from the request queue to send a transaction while a block next request state machine on any processor still contributes to the stall signal on the system bus. Once all of the processors stop contributing to the stall signal, then the request state machine may assert a bus request.

In step 310, then the request state machine prepares to assert a bus request upon the satisfaction of two conditions. First, the arbitration component detects that all of the processors have deasserted the stall signal. The arbitration component communicates to the request state machine that all the processors have completed their initialization sequences. Each processor connected to the system bus, in either step 308 or step 306, stops contributing to the stall signal once that processor completes its initialization sequence. Second, by having a benign transaction stored in the request queue, this processor knows that it and all of this processor's internal components have successfully completed their initialization.

In step 311, the operable processors in the system initiate an arbitration event, such as bus request signal to transmit the benign transaction across the system bus. In an embodiment, the request state machine in each operable processor ensures that the request queue has a transaction pending and that the arbitration component has set a bit in the control register indicating that all the processors have completed their initialization sequences. Once these two conditions are satisfied, the request state machine is ready to initiate an arbitration event to determine the BSP. Upon issuing the bus request signal the BSP determination occurs. The signal from the request queue indicates that this particular processor has successfully completed its initialization sequence. The signal from the arbitration component indicates that all of the operable processors in the fault tolerant multiprocessor system are ready to enter the bootstrap processor arbitration process.

In step 312, arbitration protocol determines a BSP from all of the operable processors in the multiprocessor system irrespective of the initialization time of a particular operable processor. In an embodiment, system logic assigns a specific ID to each processor during the reset period in step 301. In an embodiment, the processor assigned the lowest ID number is the predetermined BSP candidate. In an embodiment, the processor assigned the highest ID number is the predetermined BSP candidate. Only operable processors assert their bus request line signal. If the predetermined BSP candidate is operable, then this processor becomes the BSP. If the predetermined BSP candidate is not operable, then the next processor in the sequence of IDs assigned, which asserts its bus request signal becomes the BSP. For example, if first processor having the lowest ID issues a bus request signal, then the first processor and all the other processors know that the first processor is the BSP. In an embodiment, a vendor may set the predetermined processor used by the arbitration protocol.

In another embodiment, the system logic assigns a specific ID to each processor. The arbitration protocol sequences through all of the processors until an operable processor is found. The arbitration protocol then designates the operable processor as the bootstrap processor.

In another embodiment, the system logic assigns a specific ID to each processor. The arbitration protocol sends a signal to each operable processor. The arbitration protocol determines the BSP in a weighted fashion. For example, to weight the selection process, the predetermined processor is given three request slots and the remaining processors are each given one request slot. Each request carries the ID of the processor sending that request. The first request received by a component, such as a register in the BIOS, determines the BSP. Once the BSP is determined then the system logic sends a signal to that processor to designate itself as the BSP processor for the system. In an embodiment, the arbitration protocol may be micro code instructions, logic circuitry located in the processor itself, or some combination of micro code and logic circuitry.

In step 313, upon receiving a signal from the arbitration component, the central processing unit sets a bit, such as the I'm BSP bit, in the control register to indicate that BSP designation. The central processing unit also clears the bit set in step 302 which indicates that the BSP has not yet been determined. The BSP fetches the operating system code. The BSP commences with initializing all of the components in the system. In an embodiment, the multiprocessor system is a fault tolerant because only the operable processors participate in the BSP determination process. In an embodiment, the arbitration component monitors the system to see which processor sent the first benign transaction. If the arbitration ID of the processor making the first benign transaction matches the ID of this particular processor, then the arbitration component initiates the I'm the BSP bit setting process. In an embodiment, the bus controller sets the "MP_INIT done" when the BSP selection process completes.

In step 314, if the arbitration ID of the processor making the first benign transaction does not match the ID of this particular processor, then the arbitration component initiates the I'm an application processor (AP) bit setting process. Upon receiving the signal from the arbitration component, the micro code instructs the CPU to designate the processor as an application processor (AP) and not the BSP. The micro code instructs the CPU to clear the bit in the control register storing a BSP designation. The micro code also clears the bit set in step 302 which indicates that the BSP has not yet been determined. The micro code sets a bit in the control register to designate the processor as being an application processor.

In step 315, the application processors wait for the BSP to send a startup interprocessor interrupt (SIPI) in order to commence normal symmetric operations in the multiprocessor system.

In an embodiment, a computer program directs and controls the operation of the BSP determination process. This program can be embodied onto a machine-readable medium. A machine-readable medium includes any mechanism that provides (i.e., stores and/or transmits) information in a form readable by a machine (e.g., a computer). For example, a machine-readable medium includes read only memory (ROM); Micro code; random access memory (RAM); magnetic disk storage media; optical storage media; flash memory devices; electrical, optical, acoustical or other form of propagated signals (e.g., carrier waves, infrared signals, digital signals, etc.); etc.

While some specific embodiments of the invention have been shown the invention is not to be limited to these embodiments. For example, most functions performed by electronic hardware components may be duplicated by software emulation. The invention is to be understood as not limited by the specific embodiments described herein, but only by scope of the appended claims.

What is claimed is:

1. A method, comprising:
   determining whether each of a plurality of processors in a fault tolerant multiprocessor system is operable;
   wherein said determining further comprises determining whether each processor is asserting a stall signal on a system bus; and
   selecting a bootstrap processor from among the operable processors irrespective of an initialization time of a particular operable processor.

2. The method of claim 1, further comprising:
   determining whether all of the operable processors are ready to enter a bootstrap processor arbitration process.

3. The method of claim 2, wherein determining whether all of the operable processors are ready further comprises:
   determining whether each processor has de-asserted the stall signal on the system bus; and
   determining whether a request queue indicates a pending transaction for the system bus.

4. The method of claim 1, wherein asserting is selected from one in a group consisting of driving a signal line to a logical 0, driving the signal line to a logical 1, toggling the signal line from a logical 1 to a logical 0, and driving the system bus to a logic state on a first clock cycle and releasing the system bus on a second clock cycle.

5. The method of claim 1, wherein the fault tolerant multiprocessor system comprises a multiprocessor system which continues to be operable irrespective of a fault occurring in any particular processor.

6. The method of claim 1, wherein determining whether each processor is operable further comprises determining whether each processor has successfully completed an initialization and testing sequence.

7. A computing system, comprising:
   a plurality of processors;
   a system bus coupled to each of the processors;
   an arbitration protocol to determine a bootstrap processor from the plurality of processors irrespective of an initialization time of a particular processor; and
   logic to ensure that a) a stall signal has been de-asserted on the system bus by each processor and that b) at least one processor is operable prior to allowing the operable processors to enter a bootstrap processor arbitration process.

8. The computing system of claim 7, wherein the arbitration protocol comprises micro code instructions.

9. The computing system of claim 7, wherein the arbitration protocol comprises logic circuitry located in a processor.

10. The computing system of claim 7, wherein the arbitration protocol conducts the bootstrap processor arbitration process across the system bus.

11. The computing system of claim 7, wherein each of the processors has a bus controller, the bus controller to stall transactional activity on the system bus until all operable processors are ready for the bootstrap processor determination.

12. An apparatus, comprising:
   a computer readable media; and
   instructions embedded on the computer readable media, the instructions when executed by a machine, cause the machine to perform operations comprising:
   determining whether each of a plurality of processors in a fault tolerant multiprocessor system is contributing to assertion of a stall signal on a system bus; and
   allowing one or more selected ones of the plurality of processors to enter a bootstrap processor arbitration process responsive to both 1) the stall signal has been de-asserted on the system bus by each of the plurality of processors and 2) the selected processors are operable.

13. The apparatus of claim 12, wherein de-assertion of the stall signal by a particular processor indicates that the particular processor has completed an Initialization sequence.

14. The apparatus of claim 12, wherein the instructions when executed by a machine, further cause the machine to determine that a particular one of the processors is operable if the particular processor has 1) de-asserted the stall signal and 2) indicated successful completion of an initialization sequence.

15. The apparatus of claim 12 wherein the instructions comprise micro code.

16. The apparatus of claim 14, wherein the instructions that cause the machine to determine if a particular processor has indicated successful completion of an initialization sequencer further comprise instructions that cause the machine to determine whether a transaction request for the system bus has been pended.

* * * * *